United States Patent
Baskinger et al.

(10) Patent No.: US 11,074,265 B2
(45) Date of Patent: Jul. 27, 2021

(54) EXPRESSION DATA STRUCTURE DATASET PROCESSING

(71) Applicant: International Business Machines Corporation, Armonk, NY (US)

(72) Inventors: Samuel R. Baskinger, Madison, WI (US); Chad Johnson, Cross Plains, WI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 427 days.

(21) Appl. No.: 15/943,450

(22) Filed: Apr. 2, 2018

(65) Prior Publication Data

US 2019/0303484 A1 Oct. 3, 2019

(51) Int. Cl.
*G06F 16/00* (2019.01)
*G06F 16/2458* (2019.01)
*G06F 16/29* (2019.01)

(52) U.S. Cl.
CPC ......... *G06F 16/2465* (2019.01); *G06F 16/29* (2019.01)

(58) Field of Classification Search
CPC ...... G06F 7/544; G06F 16/2465; G06F 16/29; G06F 16/2246
See application file for complete search history.

(56) References Cited

U.S. PATENT DOCUMENTS

| | | | |
|---|---|---|---|
| 7,979,209 B2 | 7/2011 | O'Hara et al. | |
| 8,332,188 B2 | 12/2012 | McConaghy | |
| 9,753,947 B2 | 9/2017 | Goering et al. | |
| 9,886,491 B2 | 2/2018 | Hong | |
| 2003/0120682 A1* | 6/2003 | Bestgen | G06F 16/24526 |
| 2003/0216949 A1 | 11/2003 | Kram et al. | |
| 2012/0005190 A1* | 1/2012 | Faerber | G06F 16/24524 707/718 |
| 2013/0300769 A1* | 11/2013 | Huang | G09G 5/00 345/658 |
| 2015/0370828 A1 | 12/2015 | Maurer et al. | |
| 2016/0148409 A1 | 5/2016 | Fleizach et al. | |
| 2017/0059330 A1* | 3/2017 | Pfeifle | G01C 21/20 |

OTHER PUBLICATIONS

Wikipedia, Scripting language, <https://en.wikipedia.org/wiki/Scripting_language> (Year: 2020).*
Li, et al. "*Symbolic Expressions of Difference Extrema Between Regular Latitudes*" Cehui Xuebao/Acta Geodaetica et Cartographica Sinica, vol. 43, No. 2, pp. 214-220, 2014.
P. Mell, et al. "*The NIST Definition of Cloud Computing*", NIST Special Publication 800-145, Sep. 2011, Gaithersburg, MD.

* cited by examiner

*Primary Examiner* — Hung Q Pham
(74) *Attorney, Agent, or Firm* — Robert Shatto; George S. Blasiak; Heslin Rothenberg Farley & Mesiti PC

(57) ABSTRACT

Methods, computer program products, and systems are presented. The method, computer program products, and systems can include, for instance: initiating evaluating of a tree data structure expression having nodes and edges between the nodes, wherein a plurality of nodes of the tree data structure expression express functions, and wherein a hierarchy of the tree data structure expression defines an order of execution of functions expressed by nodes of the plurality of nodes; and in response to the initiating, reading, processing and writing tile data of a dataset according to node expressed functions of the tree data structure expression.

20 Claims, 11 Drawing Sheets

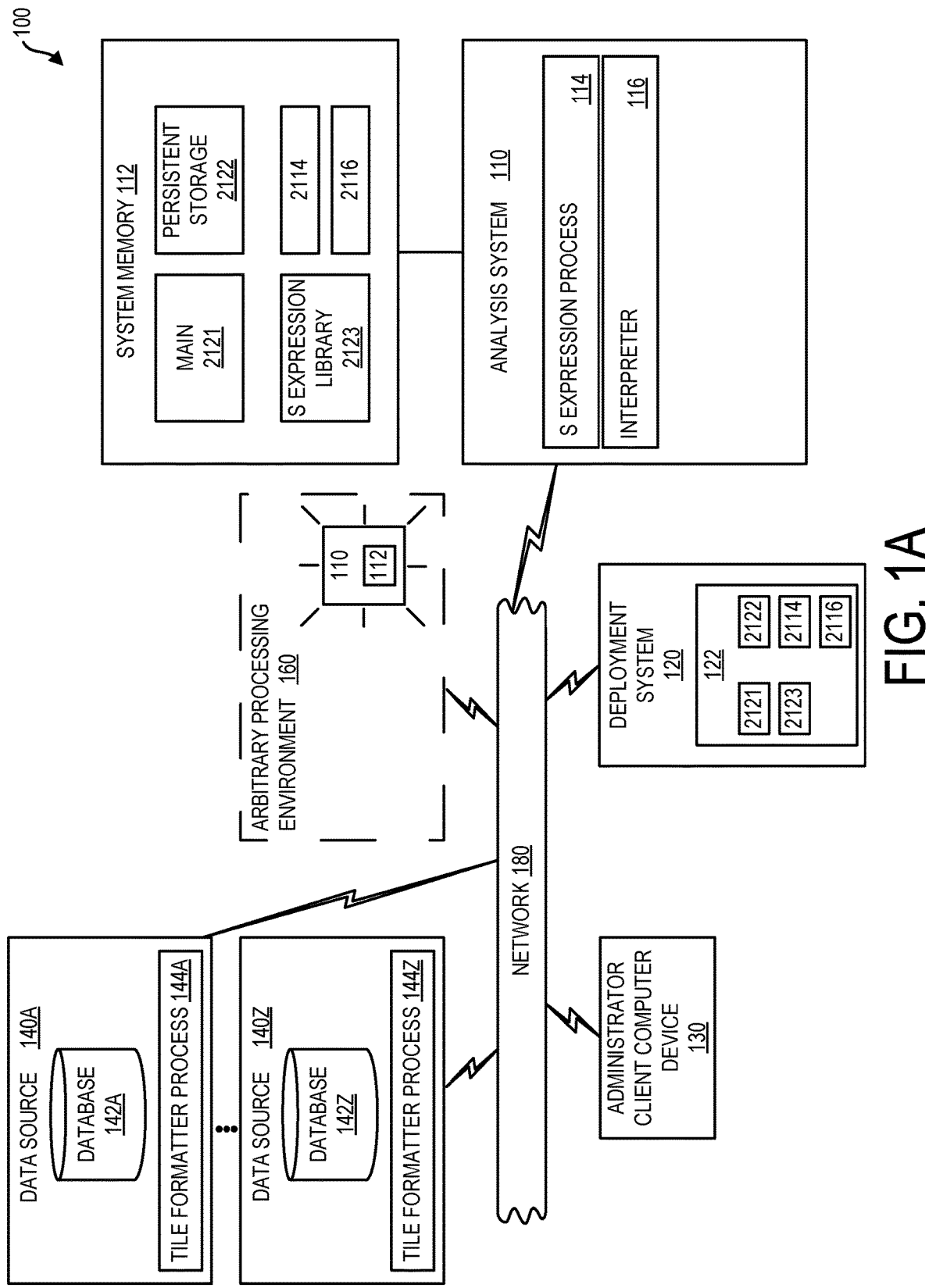

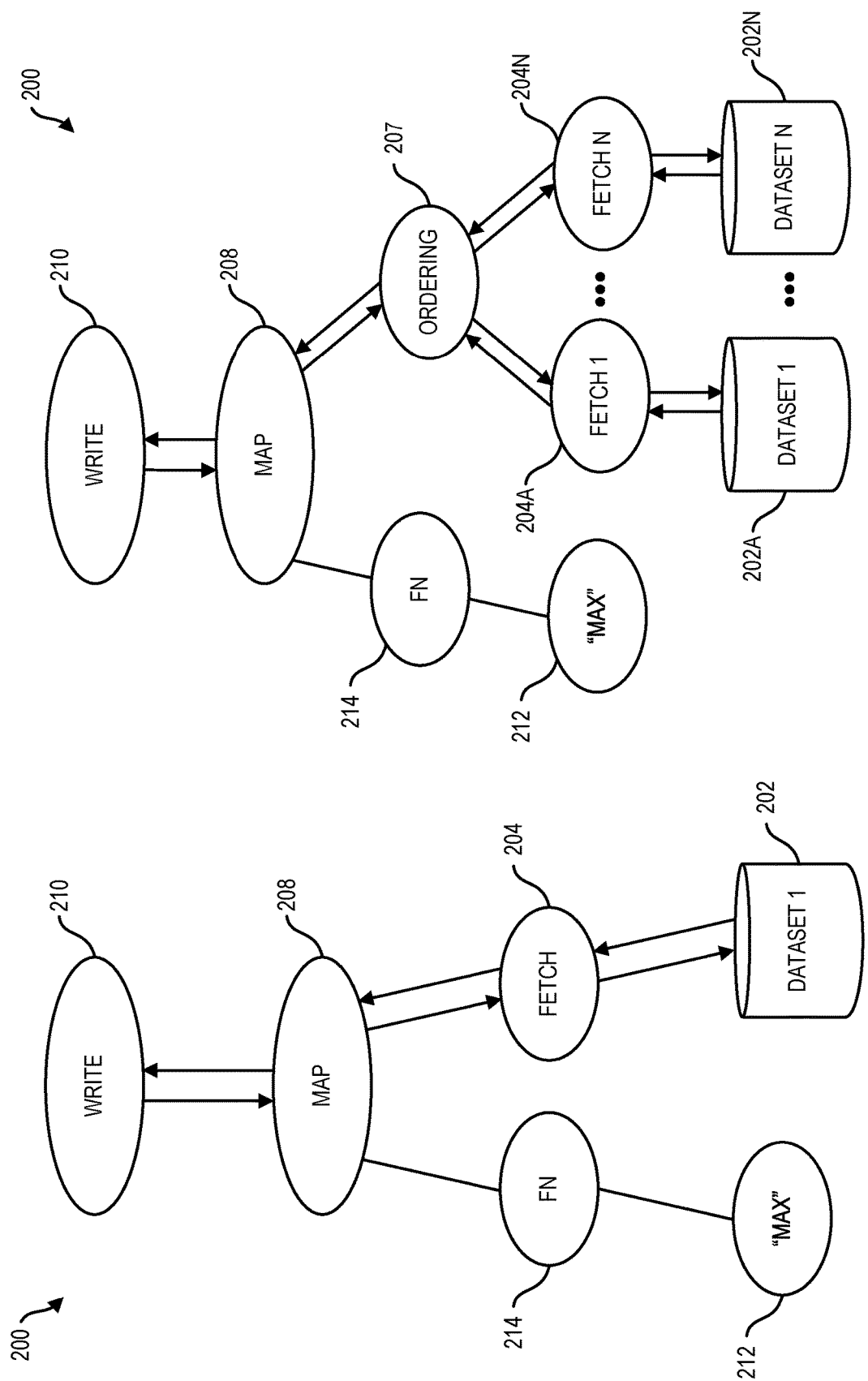

EXPRESSION DATA STRUCTURE DATASET PROCESSING

BACKGROUND

The present disclosure relates to data processing in general and specifically to data analytics.

Data analytics (DA) is the science of examining raw data with the purpose of drawing conclusions about that information. Data analytics is used in many industries to allow companies and organizations to make better business decisions and in the sciences to verify or disprove existing models or theories. Data analytics is commonly used to aid in data mining depending on the scope, purpose and focus of the analysis. Data miners sort through datasets using sophisticated software to identify undiscovered patterns and establish hidden relationships.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

With the proliferation of computing nodes and advances in data capture technologies dataset sizes continue to grow. Datasets of geographical information systems (GIS), for example, continue to grow in size giving rise to new data management and data analysis challenges.

SUMMARY

Shortcomings of the prior art are overcome, and additional advantages are provided, through the provision, in one aspect, of a method. The method can include, for example: initiating evaluating of a tree data structure expression having nodes and edges between the nodes, wherein a plurality of nodes of the tree data structure expression express functions, and wherein a hierarchy of the tree data structure expression defines an order of execution of functions expressed by nodes of the plurality of nodes; and in response to the initiating, reading, processing and writing tile data of a dataset according to node expressed functions of the tree data structure expression.

In another aspect, a computer program product can be provided. The computer program product can include a computer readable storage medium readable by one or more processing unit and storing instructions for execution by one or more processor for performing a method. The method can include, for example: initiating evaluating of a tree data structure expression having nodes and edges between the nodes, wherein a plurality of nodes of the tree data structure expression express functions, and wherein a hierarchy of the tree data structure expression defines an order of execution of functions expressed by nodes of the plurality of nodes; and in response to the initiating, reading, processing and writing tile data of a dataset according to node expressed functions of the tree data structure expression.

In a further aspect, a system can be provided. The system can include, for example a memory. In addition, the system can include one or more processor in communication with the memory. Further, the system can include program instructions executable by the one or more processor via the memory to perform a method. The method can include, for example: initiating evaluating of a tree data structure expression having nodes and edges between the nodes, wherein a plurality of nodes of the tree data structure expression express functions, and wherein a hierarchy of the tree data structure expression defines an order of execution of functions expressed by nodes of the plurality of nodes; and in response to the initiating, reading, processing and writing tile data of a dataset according to node expressed functions of the tree data structure expression.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1A depicts a system having a data source and an analysis system according to one embodiment;

FIG. 2C depicts a data structure according to one embodiment;

FIG. 2D depicts a data structure according to one embodiment;

DETAILED DESCRIPTION

Figure 1B:
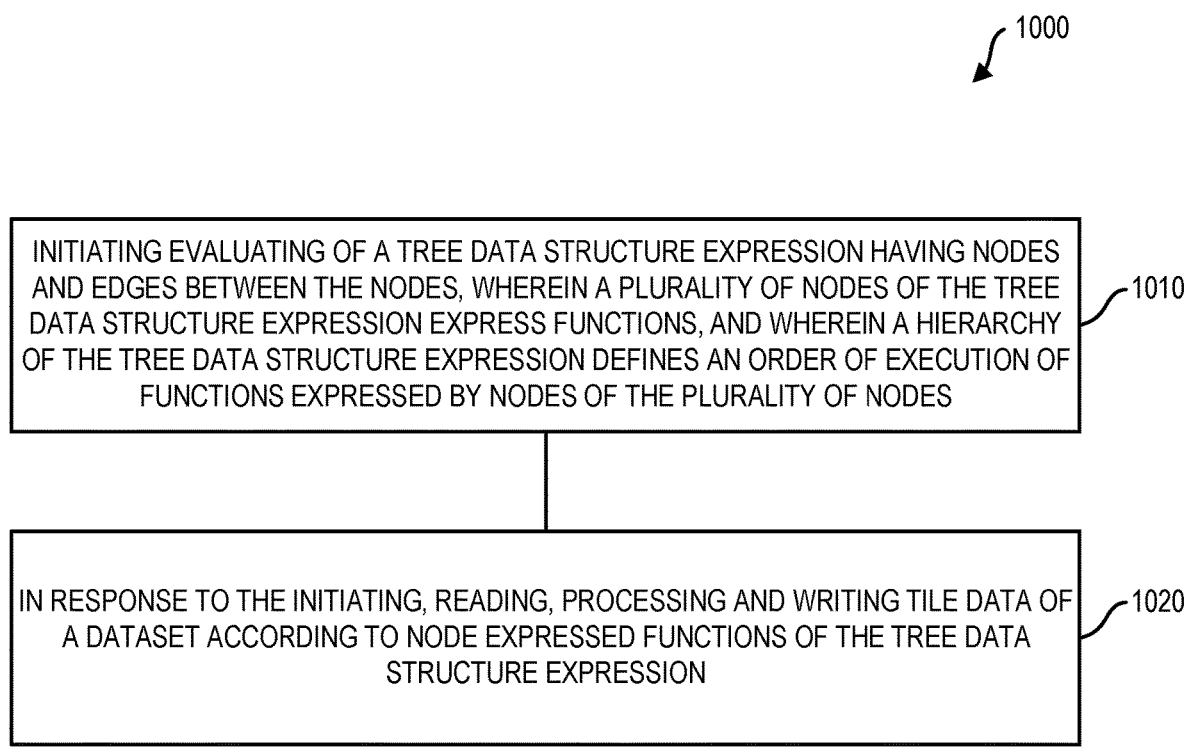
FIG. 1B is a flowchart depicting operations of an analysis system according to one embodiment.

System 100 for use in processing data according to one embodiment is illustrated in FIG. 1A. System 100 can have a data sources 140A-140Z for storing data, an analysis system 110 having an associated system memory 112. System 100 in one embodiment can include a deployment system 120 having an associated system memory 122. System 100 in one embodiment can include an administrator client computer device 130.

Data source 140 analysis system 110, deployment system 120 and administrator client computer device 130 can be connected via network 180. Network 180 can include one or more of a physical telecommunications network or a virtual network. A physical network can be for example, a physical telecommunications network connection numerous computer nodes or systems such as computer servers and computer clients. A virtual network can for example, combine numerous physical networks or parts thereof into a logical virtual network. In another example, numerous virtual networks can be defined over a single physical network.

In one embodiment, data sources 140A-140Z, analysis system 110, deployment system 120 and administrator client computer device 130 can be external to one another. In one embodiment, one or more of data sources 140A-140Z, analysis system 110, deployment system 120 and administrator client computer device 130 can be co-located with one another.

System 100 can be configured to process data, and in one embodiment can be operative to process data of datasets. In one embodiment, system 100 can be provided by a geographical information system (GIS) which is a system designed to capture, store, manipulate, analyze, manage, and/or present spatial geographic data. Data systems known as GIS data systems handle large volumes of data. Datasets of a GIS system can include e.g. radar datasets, and precipitation datasets. GIS datasets can include high resolution geospatial datasets specifying parameters for a geospatial area. A geospatial area dataset can include e.g. 2D data or 3D (e.g. point cloud) data.

Analysis system 110 as set forth herein can run an S expression process 114 and can include an interpreter 116 for running high level script commands that can be executed without being compiled. System memory 112 of analysis system 110 can include main memory 2121 and persistent storage 2122. In system memory 112, e.g. in one or more of main memory 2121 or persistent storage 2122, there can be stored an S expression library 2123 that stores various S expressions that can be processed by analysis system 110 for use in processing datasets of data source 140. System memory 112 can also store library 2114 for supporting S expression process 114 and library 2116 for supporting interpreter 116. In one embodiment, an administrator can use administrator client computer device 130 to author and/or select new S expressions for execution by analysis system 110.

Data source 140A-140Z in one embodiment can include respective databases 142A-140Z. Each data source 140A-140Z and can run a respective tile formatter process 144A-144Z for formatting data of respective database 142A-140Z into tile format. Each databases 142A-142Z can be configured to store one or more large volume geospatial dataset. In one embodiment databases 142A-142Z can be relational databases having an associated relational database management system. In one embodiment databases 142A-142Z can be configured to be queried with use of Structured Query Language (SQL) commands. In one embodiment data sources 140A-140Z can be external to one another. In one embodiment one or more data source of data sources 140A-140Z can be co-located with one another. In one embodiment databases 142A-142Z can be external to one another. In one embodiment one or more databases of databases 142A-142Z can be co-located with one another.

A tile formatter process of tile formatter processes 144A-144Z can format dataset data into tile format. A tile format in one embodiment can include a structure having three location values, x, y, and LOD (level of detail), and an array of tile data. Tile data can include 256×256 floating point values. A tile can be represented in one embodiment as three integers denoting the tile's "address" on the map and a 2-dimensional array of data, typically 256×256 floating point numbers. A tile formatter process of tile formatter processes 144A-144Z can alternatively format tiles into a 3D tile format, e.g. 3D Tiles, available as part of the Open Geospatial Consortium (OGC) Community Standard.

A tile formatter process of tile formatter processes 144A-144Z can device a large grid of cells (a map) into a series of smaller two-dimensional grid of cells. Each tile according to a formatting process can have an "address" to facilitate reassembly back into the larger map. The whole map has the "address" X=0, Y=0, LOD=0. The upper-left quarter of the map, after dividing of a map can be X=0, Y=0, LOD=1. LOD specifies a level of detail. When a level of detail is increased by +1 a number of tiles of data can be quadrupled. Each tile stores the same number of bytes of data, and so file size can also be quadrupled. The top-right tile is X=1, Y=0, LOD=1, the bottom-left is X=0, Y=1, and LOD=1, and the bottom-left is X=1, Y=1, and LOD=1. System 100 can stream tiles using fixed processing routines.

Embodiments herein recognize that one commonly used approach for processing a GIS dataset is to author compile and run a compiled program using a raster data optimized development platform such as the open source platform GEOTRELLIS™. (GEOTRELLIS is a trademark of the Eclipse Foundation, Inc.). Embodiments herein recognize that commonly used systems for processing large volume datasets such as GIS system datasets can be inefficient in terms of resource utilization, e.g. processor and memory utilization. Embodiments herein recognize that compiled code approaches can create problems such as deployment delays attributable to compile times. Raster data optimized development platform approaches can also consume resources and restrict resource utilization, i.e. once a computing node is configured as a dedicated processing server, the server may not be available for other purposes. If the dedicated server is not needed, the server is configured but not providing any processing. If multiple clients may desire access to the dedicated processing server creating bottlenecking issues. Embodiments herein recognize that approaches built on platforms optimized for processing speed may have significant memory consumption requirements. Embodiments herein recognize that complied code approaches built on platforms optimized for processing speed may invoke processing by multiple computing node computing clusters for applications that can be serviced with use of a single computing node. Some approaches may require that an entire dataset be stored into working memory for facilitation of processing and or storage hungry offloading to dataset data to persistent storage.

A method 1000 for performance by analysis system 110 according to one embodiment is set forth in the flow diagram of FIG. 1B. At block 1010 analysis system 110 can perform initiating evaluating of a tree data structure expression having nodes and edges between the nodes, wherein a plurality of nodes of the tree data structure expression express functions, and wherein a hierarchy of the tree data structure expression defines an order of execution of functions expressed by nodes of the plurality of nodes. At block 1020 analysis system 110 can perform in response to the initiating, reading, processing and writing tile data of a dataset according to node expressed functions of the tree data structure expression.

Figure 2B:
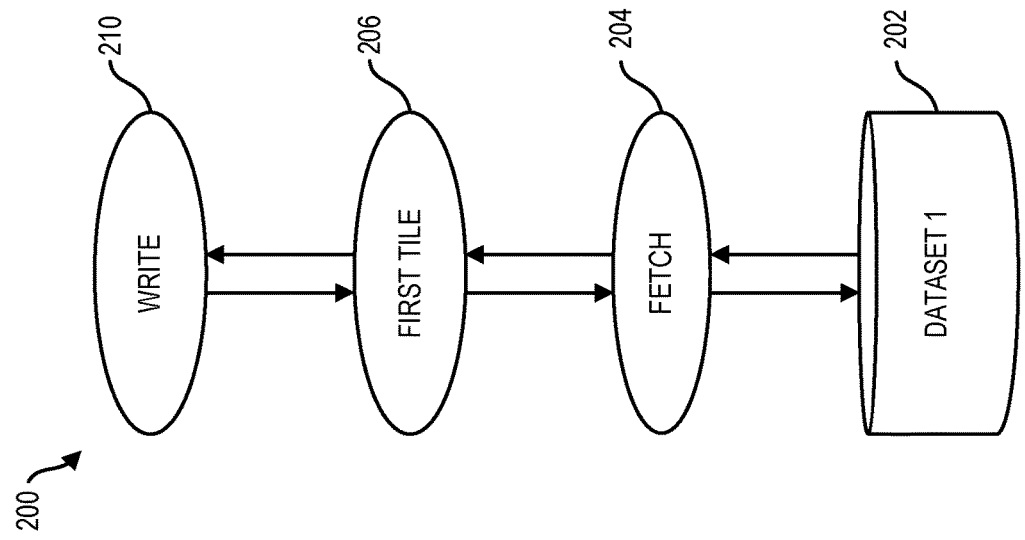
FIG. 2B depicts a data structure according to one embodiment.
Figure 2A:
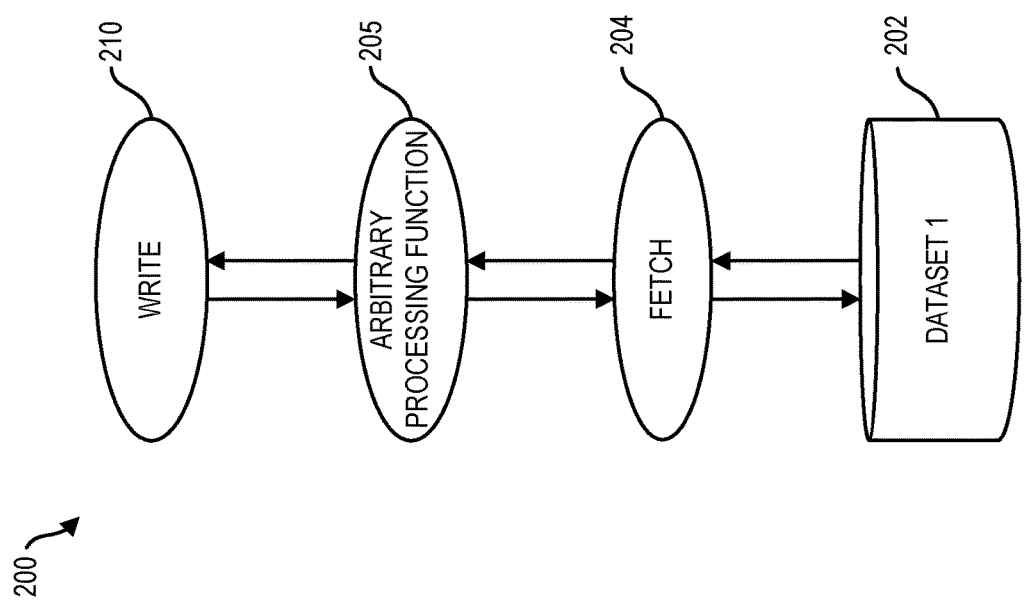
FIG. 2A depicts a data structure according to one embodiment.

Referring to FIG. 2A, embodiments herein can feature use of a Symbolic expression (S expression) to facilitate resource conserving processing of large volume datasets such as geospatial datasets. FIG. 2A illustrates a representation of an S expression 200 having a hierarchical data structure, wherein nodes express functions and the edges of the data structure specify relationships between the various functions, and wherein the hierarchy of the S expression 200 specifies an order of execution of the specified functions that are specified in the nodes of the S expression 200. S expressions 200 herein define a data structure in the form of a relationship graph. The relationship graph can be provided by a tree diagram relationship graph data structure having a nodes and edges, wherein the nodes define hierarchy having parent (higher order) nodes and child (lower order) nodes.

In one embodiment, an S expression 200 can be processed with S expression process 114 which can be referred to as an S expression evaluator. S expression process 114 for processing (evaluating) S expressions can be written in a compiled code language in one embodiment. Functions that are specified in nodes of an S expression 200 herein can be expressed using commands, which can be scripting language commands that are not complied to be executed. Interpreter 116 can be written in a compiled code language so that such commands call functions that can be encoded using a compiled code language. Functions that are expressed within nodes of S expression 200 defining a data structure can be scripting computer language commands that run with use of an interpreter 116 and which do not require program compiling for execution. Analysis system 110 can be configured to process an S expression based on a configuration of an S expression and based on a configuration of S expression process 114 which includes machine logic encoded rules for processing (evaluating) S expressions.

An S expression can define an order of execution in one embodiment by encoding at least one higher order node to make a call for data on a lower order node. An S expression can define an order of execution in one embodiment by encoding at least one higher order node to make a call for data on a lower order node and restricting a function of the at least one higher order node until the called data is received from the lower order node.

Referring to an order of execution defined in S expression 200 of FIG. 2A, higher order nodes can make calls for data on lower order nodes. If the lower order node has data it sends the data to a higher order node and the higher order node performs its function. If a lower order node is not ready to send up data, it calls its lower order node to send up data and so on. Thus, referring to S expression 200, write node 210 for performing the function of writing data to memory can initially have no data to send and can therefore call lower order node 205 expressing an arbitrary processing function which can also have no data to send up, which can call its lower order child node 204 expressing a fetch function to send data up. To respond to the data call from node 205, node 204 expressing a fetch function can read (fetch) a first tile, tile1 from dataset1 (reference element 202) of a certain database of system 100, e.g. database 142A. The tile can be received from database 142A and passed up to arbitrary processing function node 205 for processing which can pass the processing result to write node 210 for writing a result to memory e.g. of system memory 112 of analysis system 110 and/or to an external storage location e.g. a database of databases 142A-142Z. On writing of the first tile, write node 210 calls for data to its lower node which calls its lower node and so on until fetch node 204 reads a next tile, tile2 from the dataset, and the process can iterate until a last tile of a dataset is read, processed and written. Tiles can be read, processed and written from a dataset in succession.

Referring to S expressions 200 herein upper nodes can call for data. Lower nodes can respond to a call for data by at least satisfying the immediate call. In some embodiments lower nodes may pre-compute some data as an optimization to prevent e.g. out-of-memory conditions or CPU starvation conditions (where a CPU is available to do work but no work is ready to be done, e.g. waiting for data from a network). According to one embodiment, implementations may not pre-compute without limit. According to one embodiment, if a branch is never called for data, it will never receive control of the CPU and will never pre-compute (or compute) anything.

Evaluation of S expressions can be driven by write node 210 of S expression 200 in embodiments herein. The write function of write node 210 can be defined to collect its arguments, at least one of which can be an unbounded iteration of tile data. The write function specified in write node 210 can call for successive tile data from one of the unbounded iterations of tile data, in the order in which they are presented, and write each successive (where passed upward from a lower order node) to system memory 112 or to an external storage location e.g. the database storing the dataset.

While an execution order is described, it will be understood that a designer can adapt execution order rules depending on the particular application. The particular order of execution can be determined by the structure of the S expression, commands specified therein and a configuration of S expression process 114 defining an S expression evaluator.

The aspect that an S expression herein can define an order of execution does not require that a uniformly applied or otherwise strict order of execution be defined. For example, in some embodiments, pre-fetching of a limited number of tiles prior to a call invoked fetch by a fetch node may be advantageous. In some embodiments, execution order can be strictly defined at write node 210 which can write only on calling for and receiving data from a lower order node so that results of tile processing are only passed upward on a succession of tiles basis, but can be less strict with respect to lower order S expression nodes (e.g. to permit limited pre-fetching). In some embodiments, an S expression can define an order of execution with the order of execution being strictly defined, e.g. no higher order node ever passing data upward without first calling for and receiving data of a next tile. In some embodiments, an S expression can define an order of execution without the order of execution being strictly defined, e.g. permitting a limited pre-fetching of tiles.

Where S expressions encode higher level scripting command, execution of the higher level script commands by processing of an S expression can result in de facto control over CPU instruction execution periods without the script commands directly mapping to system level CPU scheduling instruction. Accordingly, there can conceivably be situations where CPU execution order deviates from an order of execution defined by an S expression, even where an S expression defines a strict order of execution. Nevertheless, skilled artisans will appreciate the flexibility, speed and deployment advantages of using the described S expressions for such de facto control over CPU instruction execution periods. Skilled artisans will recognize that the described de facto control over CPU instruction execution periods with use of lightweight processible and portable S expressions herein will be sufficient to yield resource utilization advantages as are set forth herein.

The order of execution defined by S expression 200 can improve processor and memory utilization. By expressing an order of execution that does not require fetching and storing of all tiles of a dataset prior to processing, S expression 200 improves memory utilization relative to an alternative method wherein all dataset tiles are stored into a system memory 112 prior to processing.

S expression 200 and/or S expression process 114 in one embodiment can be configured to define a processing rule wherein tiles are read from a database e.g. database 142A on a restricted basis, e.g. a successive N tile at a time streaming tile basis such as one tile at a time streaming tile basis. Accordingly, analysis system 110 can be configured so that system memory 212 has modest data size requirements, e.g. can be sized so that working memory 2121 records a limited number of tiles of a dataset at a time to avoid system memory hungry processing wherein an entire dataset consumes space of working memory 2121 or persistent memory 2122 for processing of the dataset.

According to one embodiment, analysis system 110 can be configured by S expression 200 and/or S expression process 114 to limit the number of tiles stored in main memory 2121 at a given time, thus improving memory utilization. For example, the number of tiles stored in working memory 2121 can be restricted to be M or less. In one example M is an integer value equal to or less than 100. In one example M is an integer value equal to or less than 50. In one example M is an integer value equal to or less than 10. In one example M is an integer value equal to or less than 5. In one example M is an integer value equal to or less than 3. In one example M is equal to 1.

In one embodiment S expression process 114 and/or S expression 200 can be configured for "unbounded" reading, processing and writing of a succession of tiles of a tile dataset. According to unbounded operation higher order nodes of an S expression 200 need not compute and track e.g. tile order number or compare a tile number to a recorded order number. According to unbounded operation higher order nodes of an S expression 200 need not obtain information of a dataset size (length). Higher order nodes may query lower order nodes e.g. "is there a next tile?" and "get the next tile" without iterative computing of a tile order number. Lower order nodes may respond simply, "yes, there is a next-tile," and always returning a tile of data until last tile data is passed upward. It will be appreciated that since nodes of an S expression 200 need not track various state information such as tile order number, memory utilization can be improved.

By specifying that tile data processed by analysis system 110 is processed as an unbounded stream of tiles, memory efficiency can be improved at least for the reason that the amount of state that is needed at any step is reduced. For example, function expressing nodes e.g. nodes 204, 205, and 210 of S expression 200 need not compute and track tile order iteratively for each tile according to one embodiment set forth herein. An unbounded stream of tiles as set forth herein in one embodiment can terminate on a termination condition being satisfied, e.g. the condition that no additional tiles remain from a dataset. A tile order number associated with the termination condition can be unknown but can be reported from a data source and on the occurrence of a no additional tiles remain condition.

System 100 in some embodiments can operate with datasets that are capable for reporting a tile count with sent tile data. For operation with such systems fetch functions e.g. as expressed in node 204 (FIG. 2A), to reduce memory utilization overhead can be absent of calls for tile order count. For operation with such systems fetch functions can include a call for tile order number when a database reports that a dataset is out of tiles. Accordingly, system 100 can obtain a count of tiles of a dataset without iterative computing of tile order number.

In one embodiment the call for another tile by higher order S expression nodes to lower order S expression nodes drives the evaluation of the rest of the expression, creating more and more unbounded iterations feeding tile data to the writer as it asks for it. The S expression can be fully evaluated when all data is written, meaning that all unbounded iterations of tile data have reported that they have reached their terminus. The write function can call for, and write to a storage location single tiles until the function it is calling reports that no tiles remain. In some embodiments tiles can be pre-fetched. Fetching tiles before they are to be immediately processed can provide advantages in various embodiments. In one aspect items known to be slow can be pre-fetched and cached for future processing.

Data resulting from processing by arbitrary processing function node 205 can take on various forms. Analysis system 110 can transform a dataset by cropping tiles. For a cropping, processing by the processing function node 205 can determine that a tile being processed will be maintained and passed through to write node 210 or alternatively discarded. The maintained tiles minus the discarded tiles define a cropped image having reduced storage requirements. In some embodiments analysis system 110 can transform a dataset by blanking tiles (changing pixel values of a tile so that they are all equal to a common value) rather than discarding tile. In some embodiments analysis system 110 can transform a dataset by changing at least one pixel value of one or more tile without tile discarding.

For a parameter generation process, a lightweight parameter may be generated by arbitrary processing function node 205 without passing a processed tile having changed or unchanged pixel values. Where the arbitrary processing function node 205 specifies a parameter generation function, successive tiles can be discarded after they are processed for parameter generation.

The S expressions 200 depicted in FIG. 2B-2E illustrate that S expressions can be authored to define a wide range of alternative processes.

S expression 200 as shown in FIG. 2B is an S expression for facilitating generation of parameter specifying maximum rain over a geographic area. In this example the [max] function (specified as the "first tile" function of node 206) expects to be given a single tile as input (representative of a larger geographical area) and will produce a single number, the maximum value present in the tile, as output. The [max] function is unaware of iterations or streams, only of how to process a single tile. The [firstTile] function expects a stream of tiles as its input, will ask for a single tile from that stream, and return that single tile as its only output. The [fetch] function (node 204) takes the name of a dataset to read from and returns a stream of tiles from that dataset 202 by addressing the appropriate database e.g. database 142A storing that dataset. The [fetch] function may prefetch some tiles. In this example any prefetched tiles will be left unconsumed as [firstTile] is fully evaluated after having fetched a single tile. Analysis system 110 can discard the single tile and the remaining prefetched tiles and can write the resulting parameter (node 210) to a storage location e.g. local persistent storage 2122 of system memory 112 or can write the extracted parameter to an external database e.g. the dataset database 142A or another external database.

S expression 200 as shown in FIG. 2C is an S expression for facilitating generation of a set of parameters specifying maximum rain and expands on the example of 2B. The example of FIG. 2C expands on the example of FIG. 2B by processing all tiles in a dataset 202 and returning a list of all max values. In this way an entire dataset may be interrogated for precipitation severity that exceeds some warning threshold. The [map] function (node 208) takes a reference to a function (the left child node) and a stream of things (the right branch). The function reference supplied on the left child node is repeatedly called, once for every tile of data available on the stream provided by the right child node. The [fn] function (node 214) takes the name of a function ("max" in this case) (node 212) and returns a reference to the function. The [map] function is unaware that it is processing tiles, only that the inputs to the function reference are available from the stream provided by the right-hand side.

S expression 200 as shown in FIG. 2D is an S expression for facilitating generation of a set of parameters specifying maximum rain and expands on the example of 2C. The output is still a list of maximum values, but the input now covers many datasets. The top of the example is the same as the previous one, there is the [map] function (node 208) and the left-hand child node produces a reference to the [map] function (node 208) described in reference to S expression 200 of FIG. 2C. The bottom of the right-hand subtree of [map] has calls to the [fetch] function but accessing different datasets. The N calls to [fetch] mean combine the N streams of tiles into a single stream of tiles that [map] can consume and apply the [map] function across.

The [ordering] function (node 207) (alternatively termed "flatten") can take as its input any number of streams, e.g. tile streams from dataset1 through datasetN (reference elements 202A-202N). In one embodiment the datasets dataset1 through datasetN can be datasets from different databases of databases 142A-142Z wherein the different databases are external to one another. Analysis system 110 of FIG. 2 processing the S expression 200 can read from all the streams until they are exhausted. The [ordering] function (node 207) returns a single stream as its output. The elements in that single returned stream are the various elements of the N input streams. The order of the elements in the output stream are the same as the relative order to other elements from the same [fetch] call, but no guarantee is made that elements from [fetch "dataset1"] will all appear before the first element from [fetch "dataset2"]. This allows for [ordering] to pull data from N sources in parallel and return the first available. The function [ordering] can present N streams as a single stream of elements. This allows for composing datasources having different datasets into a common processing model of "a stream of tiles". The S expression implementation as shown in FIG. 2D allows for the input to [ordering] to, itself, be an unbounded stream. That is, it may be an unbounded stream-of-streams-of-tiles. It is possible to have a long running expression that will continue to draw in tiles until some one or more criterion is met that allows the expression to be satisfied.

An [ordering] (flatten) function in one embodiment can be used to combine different datasets wherein the different datasets 202A-202N are of a common data type. For example, European radar datasets and US radar datasets are different datasets of the same data type (radar) stored on different databases that are external to one another. An [ordering] (flatten) function in one embodiment can be used to combine different datasets 202A-202N wherein the different datasets are of different data types. For example a radar dataset stored on a first database 142A can be combined using an [ordering] function with a precipitation dataset (which can be stored on second database 142B according to one embodiment).

Figure 2E:
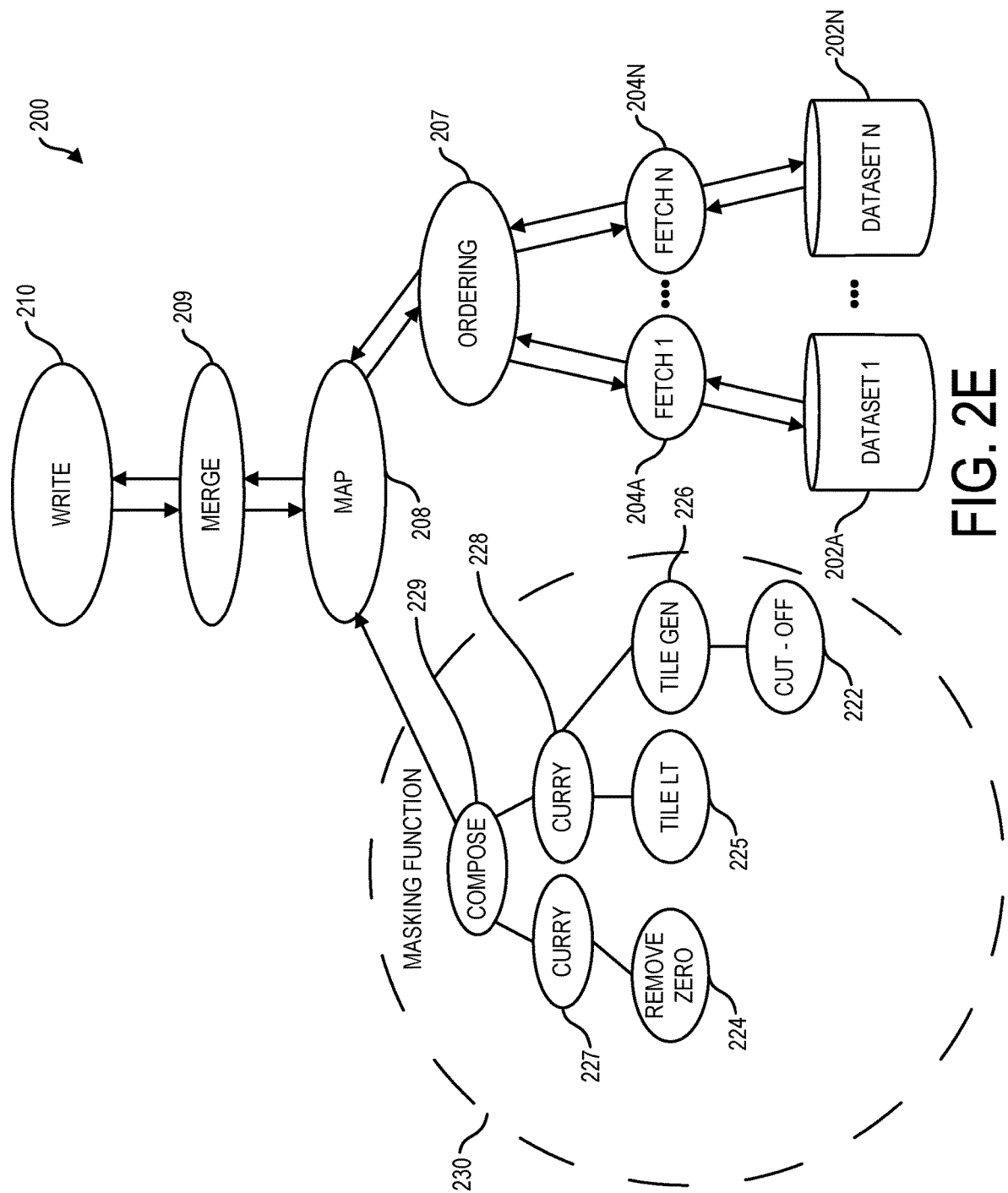
FIG. 2E depicts a data structure according to one embodiment.

FIG. 2E illustrates another example of an S expression 200. Functions expressed within nodes of an S expression can include combine functions. Combine functions can include mapping functions (node 208) and composing functions (node 222) and curry functions (node 227 and node 228) as are set forth in the example of FIG. 2E. A mapping function can apply a function to streamed data being streamed. A compose function can apply an output of a first function to a second function. Combine functions can also include curry functions (nodes). Curry functions can bind a known parameter with a function to create another function.

In one aspect functions encoded in S expression 200 can include Map Algebra commands. Map algebra is a set-based algebra adapted for processing geospatial data. Map Algebra can include primitive operations for use in processing geographic information system (GIS) datasets. Map Algebra commands can facilitate statistical operations such as minimum, maximum, average and median, relational operations compare cells using functions such as greater than, smaller than or equal to, trigonometric operations uses sine, cosine, tangent, arcsine between two or more raster layers, and exponential and logarithmic operations use exponent and logarithm functions. Map Algebra functions can be provided to operate on multiple arguments, e.g. a left tile and a right tile.

In accordance with system 100 Map Algebra commands can be expressed as script commands which do not require compiling for execution. In one embodiment the Map Algebra script commands can map to compiled code Map Algebra commands of a pre-existing library. In one embodiment, Map Algebra commands can be provided to be operational on streaming tile data. Map Algebra commands can be encoded to process single tiles or two or more tiles. Functions as set forth herein can be provided to apply Map Algebra commands to many files or properly related tiles.

Map Algebra commands can include primitive algebraic operations for use with map datasets. By combing Map Algebra commands a wide range of custom processes can be defined, which are simple to define and deploy with use of a text based file format, e.g. JSON as set forth herein.

Map Algebra commands for use with system 100 can be adapted using existing libraries encoding Map Algebra commands, e.g. compiled code Map Algebra. To author a Map Algebra function for use with system 100 the following can be performed: 1) define a function that takes two tiles as inputs and returns one tile as a returned value, 2) link-in an existing Map Algebra function, 3) write code to convert from a tile format of S expression process 114 to the format of the Map Algebra library and back.

Tile format conversion code can be written to support execution of a set of script Map Algebra commands that map to compiled code commands of a Map Algebra library having basic functions of interest. For configuring of script Map Algebra commands for use with analysis system 110, an output tile can be specified to inherit the address of an input tile subject to processing by one or more Map Algebra command. Accordingly, tiles processed by a curried Map Algebra function can retain their identifying information and have the transformed data.

Map Algebra commands can be configured with appropriate programming so that their execution results in an output a tile with the same X, Y, and LOD as an input tile but with modified data. Script Map Algebra command configured for use with analysis system 110 can take first and second tiles as inputs and the right tile's X, Y, and LOD values can be copied as the output values. By using the right tile's X, Y, and LOD values new functions can be provided where the first argument is a constant tile and [map] is applied that function across a stream of incoming tiles (the right-hand argument) and preserve the streaming-in tile's "address" (X, Y, and LOD). Curry and map functions are further described herein in reference to S expression 200 of FIG. 2E.

Referring to the example of FIG. 2E the write function (node 210) can call for and write to persistent storage (local or external), single tiles until the function it is calling reports that no tiles remain. The map function (node 208) can take the left-hand side of the expression, which evaluates to a new function called the Masking Function, to the right-hand side of the expression. The right-hand side of the function evaluates to an unbounded stream of tiles. Tiles can be emitted by the fetch functions (nodes 204A-204N) into the map function (node 208). The map function (node 208) can iteratively apply the composed Masking Function (230) (expressing a combination of Map Algebra functions) to each tile of a stream of tiles, generating a stream of tiles to be stored. In one embodiment a map function (node 208) can apply a single Map Algebra function to each tile of a stream of tiles. For example, a Map Algebra command can be provided to apply a single integer function to streaming tile data. For configuring of script Map Algebra commands for use with analysis system 110, an output tile can be specified to inherit the address of an input tile subject to processing by one or more Map Algebra command, e.g. single primitive Map Algebra command or combined Map Algebra commands, combined using e.g. curry and/or compose functions herein.

The ordering (flatten) function of node 207 can take several unbounded streams of data and presents them as a single stream. Instead of loading all tiles from all inputs, the ordering function allows load of one tile at a time. The [ordering] function can take as its input any number of streams, e.g. tile streams from dataset1 through datasetN. In one embodiment the datasets dataset1 through datasetN can be datasets from different databases of databases 142A-142Z wherein the different databases are external to one another.

The merge function of node 209 can record tile data for unique geospatial locations. If data for duplicate locations is encountered it can be merged with the already stored data. In this way only one dataset is ever needed to be stored in memory when the input datasets could overlap significantly, thus improving memory utilization. Overlapping location data can occur e.g. where an [ordering] function (node 207) combines e.g. tile streams from dataset1 through datasetN. In one embodiment the datasets dataset1 through datasetN can be datasets from different databases of databases 142A-142Z wherein the different databases are external to one another. In one embodiment a first dataset can include data for a first geographical region and a second dataset can include data for a second geographical region and the geographical regions can overlap. For merging of duplicate data, data for overlapping locations can be e.g. subject to averaging or another function wherein data from the first dataset and the second dataset is used. Alternatively, for merging of duplicate data, data from one of the datasets for the overlapping locations can be discarded.

Still referring to the S expression of FIG. 2E, FIG. 2E shows a representation of an S expression using Map Algebra primitives that, when evaluated, can result in the reading of several input datasets and writing a single output dataset.

Node 207 expresses a function called [ordering] alternatively referred to as flattening. Flattening is an operation common to functional languages that takes a list-of-list-of-elements and "flattens" elements of the inner lists down in to the single enclosing list. Accordingly, a list of lists of numbers such as [[1, 2], [3, 4]] when flattened would be the list [1, 2, 3, 4]. By flattening N streams of tiles N datasets being read by [fetch1] through [fetch N] (items 204A through 204N) can be composed into a single stream of tiles. The single stream of tile data is presented to node 208, the [map] function, as its second argument.

The [map] function (node 208) can take a function reference as its first argument and apply that function to every element that is made available by the second argument. The second argument can be an unbounded stream of elements to be processed. In the particular example those elements can be tiles of weather data. The [map] function is not aware that the elements are tiles of weather data, only that the elements may be passed to the function provided as its first argument. The [map] function returns an unbounded stream of result elements. Each result element can be computed by applying the function reference passed in as the first argument to each element made available by the unbounded stream passed to [map] as its second argument.

The [write] function (node 210) can write every element it receives from the unbounded stream returned by the [map] function to persistent storage (e.g. local persistent storage of analysis system 110 or persistent storage of an external computing node, e.g. of a data source of data sources 140A-140Z).

The left hand subtree under node 208, the [map] function, evaluates to a function. The example of S expression 200 of FIG. 2E illustrates the flexibility of encoding Map Algebra functions into S expressions. Several functions that operate on the domain of Tiles can be combined in ways to express relationships and compute results from one dataset to another. In the example of FIG. 2E several datasets can be combined with the [flatten] function to produce a single resultant dataset.

The left-hand subtree of the S expression 200 of FIG. 2E creates a new function that takes 1 tile of data as an input and produces 1 tile as its output where all values below a CUT_OFF value are removed and all other values are set to 1. The resulting function is equivalent to evaluating the tree [removeZero [tileLt [tileGen CUT_OFF] t]] where t is replaced with a single input tile.

The Masking Function (230) of S expression 200 provided by a combination of Map Algebra commands can produce a geospatial dataset of tiles in which all values below a CUT_OFF are set to 0 and all those at or above are set to 1. A masking function herein can produce an output dataset having a size in common with an input dataset but with transformed pixel values. For providing a masking function pixel values of an input tile can be transformed (e.g. set to 1 or zero). A masking function can provide a function similar to a filtering function that can be provided by system 100. For providing a filtering function, an output dataset can have tiles or pixel values of tiles that are discarded rather than merely masked (e.g. a cropped image) resulting in an output dataset of reduced size.

The [compose] function 229 can take two or more functions as inputs. The [compose] function 229 can construct a new function that, when it is called, will execute the right most function and pass its output to the function immediately to its left. For example, given function f and function g we may compose them with [compose fg] to produce a new function that would be equivalent to calling [f [g <some arguments>]].

The child nodes of compose, 227 and 228, in the described example are calls to the [curry] function. Currying is a practice in functional programming by which new functions are produced that accept only a single argument.

When a function is curried it may be easily composed with other functions or mapped across unbounded streams, as in this example.

The [curry] function (nodes 227 and 228) specified in the S expression of FIG. 2E takes the name of a function as its first argument. All subsequent arguments can be evaluated and the results of that evaluation can be stored. When the curried function is called the arguments evaluated at currying time can be provided as arguments to the function call with the last argument being that single argument passed to the current function. It can be seen that if the function f takes 2 arguments a new function g can be produced such that g is the result of [curry f 2]. When [g] is called on the argument 3 it will be as if [f 2 3] had been called.

Node 227 depicted in the S expression of FIG. 2E curries the Map Algebra function [removeZero] to no arguments. This is because [removeZero] already takes a single argument and we only would like the function reference made available to [compose]. The second argument to [compose] is more a traditional use of [curry]. Node 228 curries the Map Algebra [tileLt] function. The [tileLt] function (node 225) can compare every data value of its first argument to each corresponding data value in the second argument. A new tile is produced composed of 0 values where the first argument value was less than the second argument's corresponding value, and a 1 when the value was greater than or equal. Since [tileLt] takes 2 arguments a single argument can be applied to [curry] to produce a function that takes a single argument. The single argument curried to [tileLt] is the value produced by calling [tileGen]. The [tileGen] function when passed the CUT_OFF value produces a single tile of data where every value is set to a CUT_OFF value. Then final result of node 228 is a function that takes a single tile as input and returns a single tile in which every value that is below a CUT_OFF value is set to 0. The function created by node 228 can be referred to as the [cutOff] function. In the S expression 200 described in reference to FIG. 2E, curry and compose functions can be used to combine Map Algebra functions. In the described example node 224, node 225 and node 226 express Map Algebra functions.

Referring to [compose] node 229, the newly produced [cutOff] function (node 222) can be composed with the [removeZero] function (node 224) to produce a final function (depicted as masking function 230) that may be applied by the [map] function (node 208) to every tile of data.

As set forth in Table 1 below illustrates an example of the S expression 200 as set forth in FIG. 2E can be expressed in a text based file e.g. JSON in the example shown to facilitate portability and machine accessibility.

TABLE A

```
[ "write",
[ "merge",
[ "setT",
[ "map",
[ "compose",
[ "curry", "removeZero" ],
[ "curly", "tileLt", [ "tileGen", "CUT_OFF" ] ]
],
[ "flatten",
[ "fetch", "p1", "v1" ],
[ "fetch", "p2", "v2" ],
[ "fetch", "pn", "vn" ]
]
]
]
]
```

Analysis system 110 can be provided on a dedicated computing node but can be rapidly deployed on any available computing node. The resource requirements of analysis system 110 can be limited. As set forth herein for example, an S expression 200 and/or S expression process 114 can be configured so that a limited number of tiles are recorded into main memory 2121 at a given time during processing of an S expression. Analysis system 110 can be provided by a computing node having a system memory with available storage volume insufficient to store an entirety of a dataset being processed. In such an embodiment a data structure can restrict working memory storage to a limited number of tiles being streamed and processed tiles can be iteratively written on a streaming tile basis to an external database after processing at the computing node.

With lightweight text based scripting language S expressions and lightweight supporting libraries, analysis system 110 can rapidly be ported between computing nodes or replicated on multiple computing nodes. Embodiments herein recognize that it can be advantageous for administrator users from time to time change a computing node supporting analysis system 110, e.g. for flexibility, to take advantage of an unused generic computing node in a data center, to select a computing node particularly suited for processing according to a selected dataset or process. Referring again to FIG. 1, system 100 can include deployment system 120 for use in deploying administrator system 110. Deployment system 120 can store in its system memory 212 S expression library 2123 to facilitate selection of an S expression for deployment, and libraries 2114 and 2116 for supporting running of S expression process 114 and interpreter 116. As highlighted by arbitrary computing environment 160 analysis system 110 can be rapidly deployed on a computing node of arbitrary computing environment 160.

While porting of analysis system 110 to a data center computing node is envisioned the limited resource requirements of analysis system 110 make any computing node suitable for deployment of analysis system 110, e.g. a PC at a local area network, a mobile computing device such as a smartphone, a smartwatch, and the like.

Figure 3:
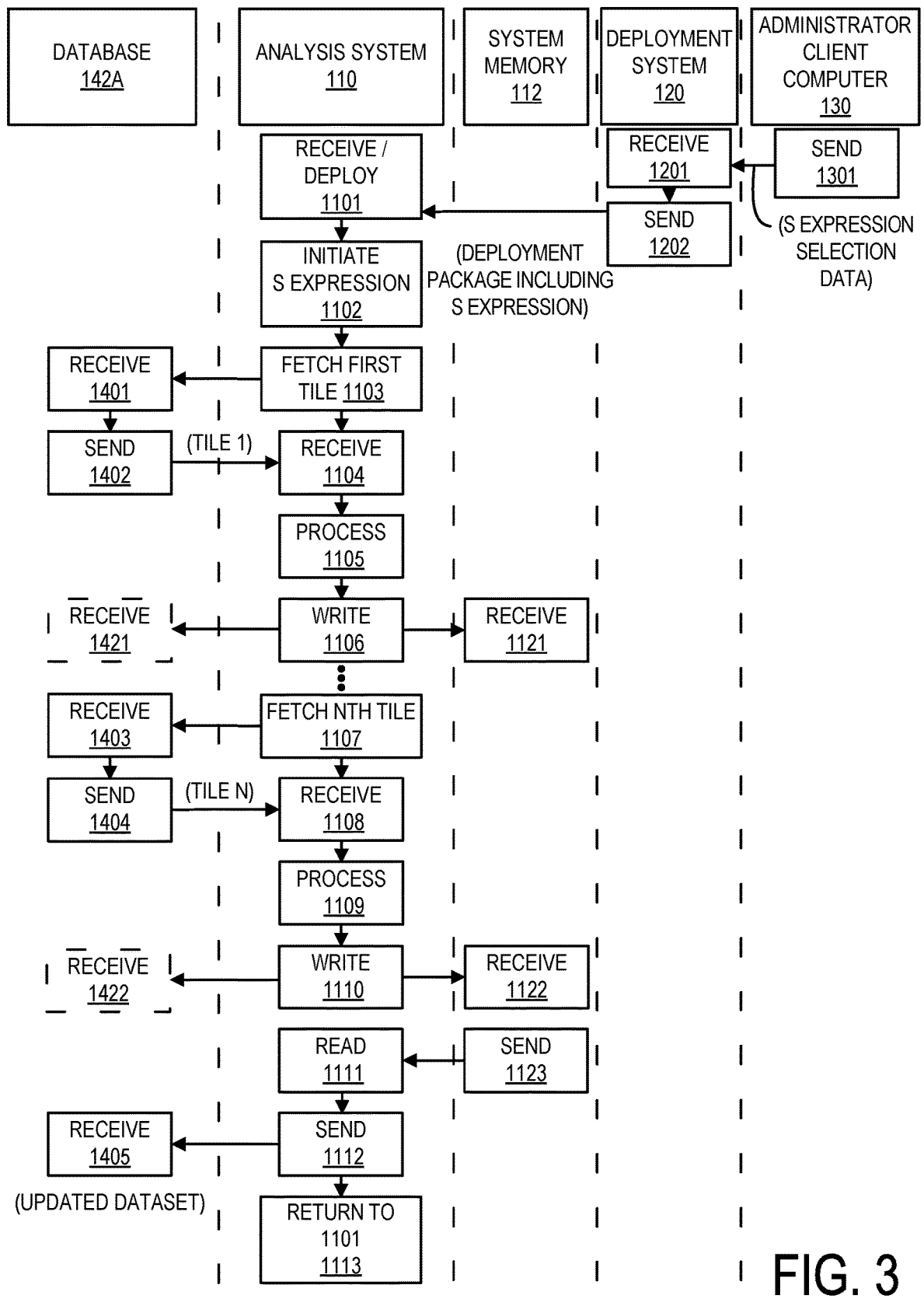
FIG. 3 is a system level swim lane flowchart depicting operations of a data processing system according to one embodiment.

A swim lane diagram illustrating operation of system 100 is set forth in one embodiment in FIG. 3. FIG. 3 depicts interoperations between administrator client computer device 130, deployment system 120, analysis system 110 which can be deployed using deployment system 120 and data source 140.

Figure 4:
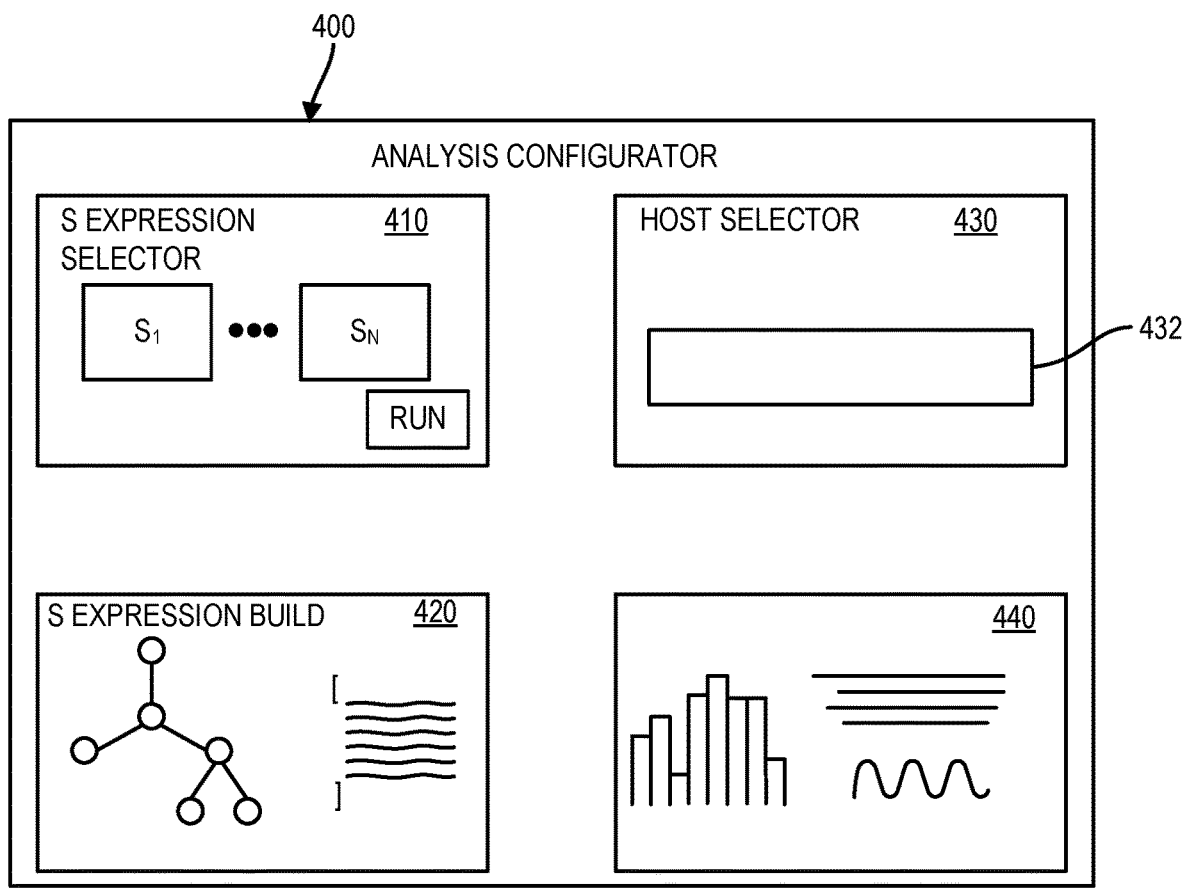
FIG. 4 depicts an administrator user interface according to one embodiment.

At block 1201, administrator client computer device 130, based on configuration data entered by an administrator user can send selection data specifying a selected S expression to analysis system 110. A selection by an administrator user can be performed with use of administrator user interface 400 as depicted in FIG. 4. Administrator user interface 400 can include S expression selection area 410 that permits selection of a certain one or more S expression that can be stored in S expression library 2123 (FIG. 1) e.g. of analysis system 110 and/or deployment system 120. Area 420 of administrator user interface 400 can be a development area that facilitates development of new S expressions. In one embodiment, development area 420 can include graphical tools for facilitating authorship of new S expressions for performing new operations for lightweight processing of large volume datasets. S expressions herein can be encoded using a text based file format e.g. JSON, YAML, or TOML to encode the expressions. Area 420 can facilitate development of new S expressions using text, including by copying an archived S expression from S expression library 2123 into area 420 and editing the same. Area 430 can be a host selector area. An administrator user can enter into area 432 a destination (e.g. URL) for deployment of an analysis system 110. System 100 can be configured so that deployment defaults to a computing node storing S expression library 2123 from which a currently selected S expression is selected in the event no address in entered into area 432. Area 440 can be a visualization area facilitating viewing of displayed visualizations of data resulting from running of an S expression.

The flow diagram of FIG. 3 illustrates a scenario wherein an S expression can be deployed on a new generic computing node selected by an administrator using a deployment system 120. Deployment system 120 at block 1201 can receive the S expression selection data. The S expression selection data can include selection data specifying selected S expression selected using area 410 of administrator user interface 400 (FIG. 4) and selection data specifying an address of a host specified using area 432.

In response to the receipt of the S expression selection data at block 1201, deployment system 120 at block 1202 can send a deployment package to the host specified in the received S expression selection data to be configured as an analysis system 110. The deployment package can include e.g. an address of the host, the selected S expression, any libraries e.g. 2114 and/or 2116 useful for supporting the running of S expression process 114 and interpreter 116 and software code for causing the running of the received S expression in response to receipt of the deployment package. In some cases, where supporting libraries 2114 and 2116 are previously installed on the host they do not need to be re-installed.

At block 1101 analysis system 110 (which originally can be a generic computing node) can receive the deployment package and can deploy the deployment package so that the receiving host is configured as analysis system 110.

Analysis system 110 can initiate running of an S expression at block 1102. In response to the initiating running of the S expression, analysis system 110 at block 1103 can fetch a first tile of a dataset (in accordance with order of execution aspects set forth in reference to FIG. 2A through 2E). Database 142A which stores the dataset can receive the fetch command at block 1401 and at block 1402 can responsively send a first tile formatted by data source 140A which is received by analysis system 110 at block 1104. At block 1105 analysis system 110 can process the first tile in accordance with functions that are specified in the S expression 200 (FIGS. 2A and 2B). At block 1106, analysis system 110 can write a result of the processing at block 1105.

According to one example, tiles can be written to remote storage as soon as they are available to a write node function (node 210 in the S expression examples of FIGS. 2A-2E) which can be implemented in a specific embodiment with a [layerWrite] function. According to one example, tiles can be written to local storage, e.g. persistent storage 2122 as soon as they are available to the [layerWrite] function. According to one example, tiles can be written to external storage e.g. of an external database external to analysis system 110. In a simple expression the [tileWrite] function can ask for a single tile, a single tile can be fetched, processed, and made available for writing. In more complex expressions it may be that requesting a single tile be written can cause several tiles to be read, some stored for later computation and some delivered to the [layerWrite] function for writing. Tiles 2 through N–1 can be fetched and processed in the manner set forth in blocks 1104 and 1105.

Continuing with reference to the flowchart of FIG. 3, analysis system 110 at block 1107 can fetch the Nth tile. The Nth tile of a dataset in one embodiment can be a last tile of a dataset having N tiles, but in another embodiment can be simply the last tile obtained from a dataset having Z tiles (Z>N), e.g. on the achievement of a termination condition. At block 1403, database 142A can receive a fetch command from analysis system 110 and can responsively send tile N for receipt by analysis system 110 at receive block 1108.

Analysis system 110 can responsively process the Nth tile at block 1109. Analysis system 110 at block 1110 can write results of the processing in accordance with S expression 200 for receipt by system memory 112 at block 1122.

At block 1111 analysis system 110 can read from system memory 112 all data resulting from processing of a current S expression (e.g. which can include a plurality of tiles). System memory 112 rand responsively send the S expression return data returned by execution of the S expression at block 1123. At block 1112 analysis system 110 can send data resulting from processing the current S expression to database 142A for storage thereon. The resulting data can in addition or alternatively be stored locally on system memory 112 of analysis system 110 or be sent for storage to another destination, e.g. dataset 142B.

The flowchart of FIG. 4 depicts an embodiment wherein tiles processed using an S expression are stored on a streaming tile basis into local system memory 112. In one embodiment, an S expression 200 and/or S expression process 114 can be configured so that writing of streaming tiles (blocks 1106 as 1110) as indicated by dashed in receive blocks 1421 and 1422 can be to an external storage location e.g. back to database 142A (where the dataset originated) or to another external database e.g. database 142A. The described alternative processing wherein processed output tiles are off loaded to an external database can reduce the resource requirements of analysis system 110 and increases portability of analysis system 110. In one embodiment writing of processed tiles at blocks 1106 and 1110 can be to local storage and simultaneously to external storage.

Figure 5:
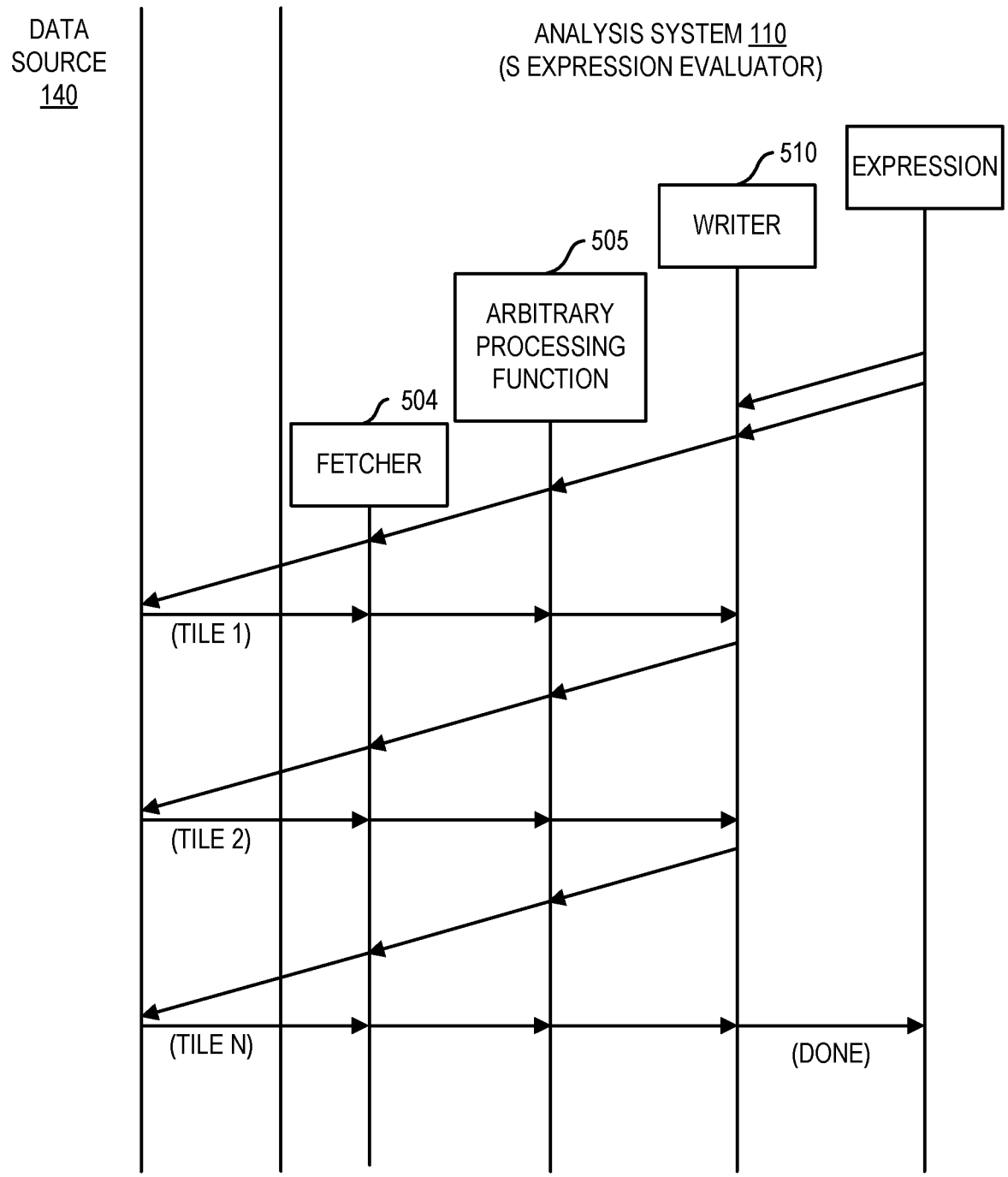
FIG. 5 is a logic level swim lane flowchart depicting operations between a data source and an analysis system according to one embodiment.

FIG. 5 is a logic level swim lane flowchart depicting interoperations between analysis system 110 and data source 140 for execution of an S expression. Using an S expression 200 e.g. as set forth in reference to FIG. 2A writer 510 defined by a root node labeled as a write node (node 210 in the S expressions of FIGS. 2A-2E) can call its child node defining arbitrary processing function 505, which can call its child node defining function fetcher 504. Fetcher 504 can fetch tile1 and pass tile 1. On writing of returned data resulting from processing of tile 1, writer 510 can make another call for data to its child node which eventually result in fetching of sequential tile, tile2. The evaluating of sequential tiles continues until a termination condition is satisfied (e.g. a data source has no more tiles to send).

Certain embodiments herein may offer various technical advantages involving computing advantages to address problems arising in the realm of computer networks. Embodiments herein can use a data structure to improve resource utilization including processing and memory utilization. A lightweight, portable data structure can be deployed in various ways to manage and process data of datasets including geospatial datasets. Embodiments herein can include use of a data structure to process a dataset using a computing node having a system memory with available storage volume insufficient to store the entirety of a dataset being processed. In such an embodiment a data structure can restrict working memory storage to a limited number of tiles being streamed and processed tiles can be written to external storage after processing. In one embodiment a lightweight data structure can encode script commands defining an ordered hierarchy of nodes. A hierarchy of nodes of the data structure can define an order of execution of the script commands to restrict resource utilization and to therefore avoid overutilization of resources. Commands encoded in a data structure can include commands for reading data from databases that are external to one another, and commands for discarding duplicate data to further reduce memory utilization.

Figure 6:
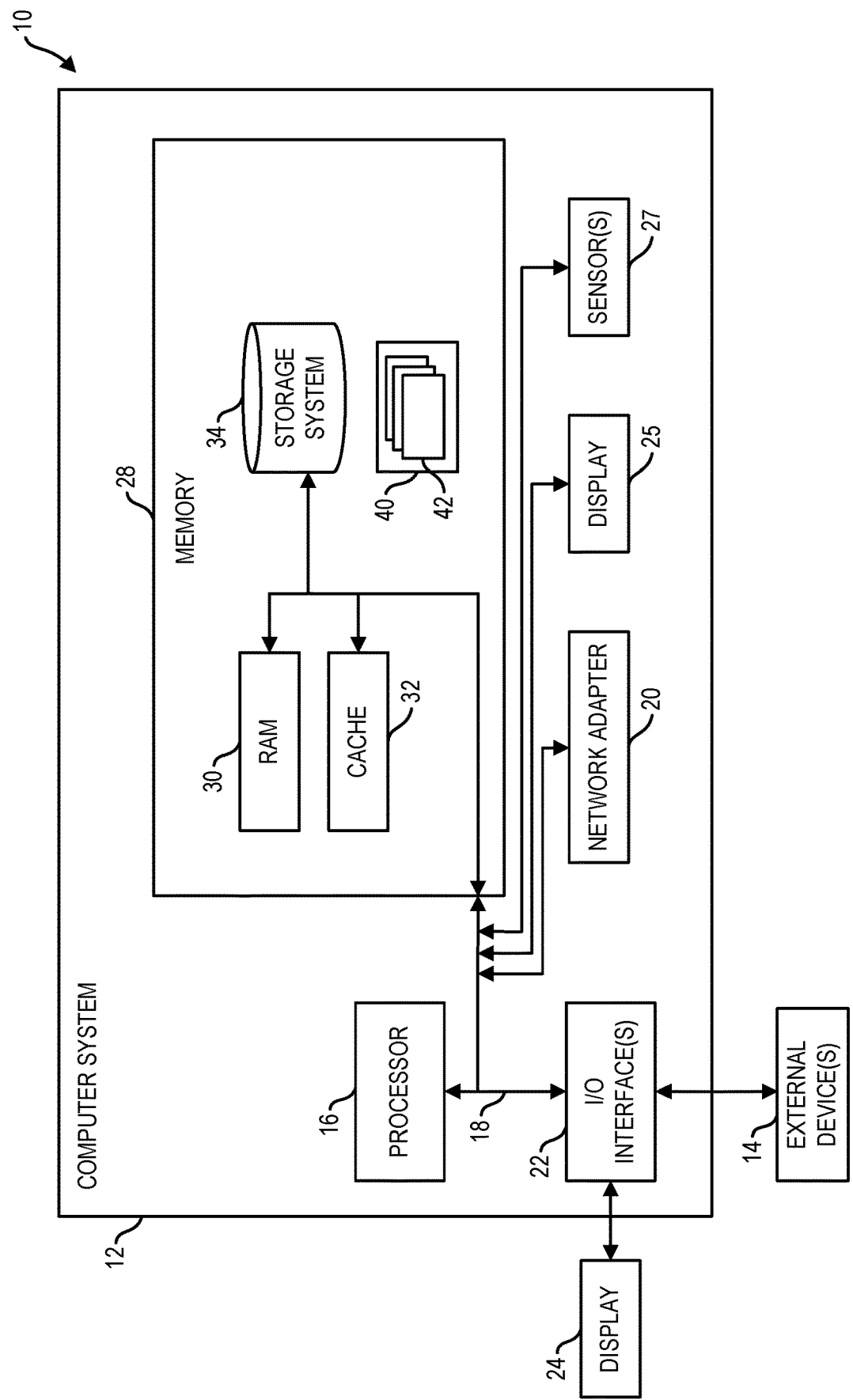
FIG. 6 depicts a computing node according to one embodiment.
Figure 7:
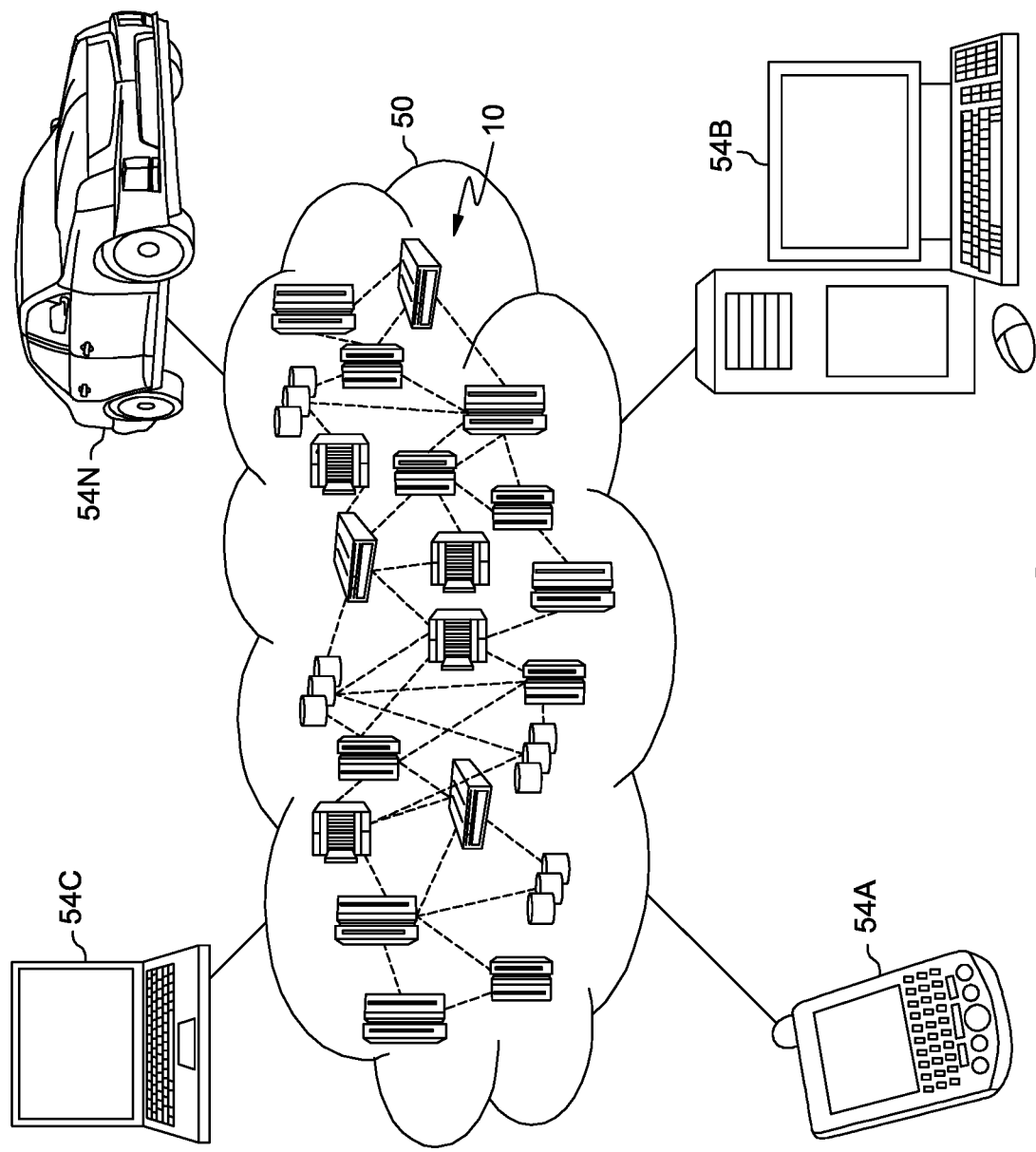
FIG. 7 depicts a cloud computing environment according to one embodiment.
Figure 8:
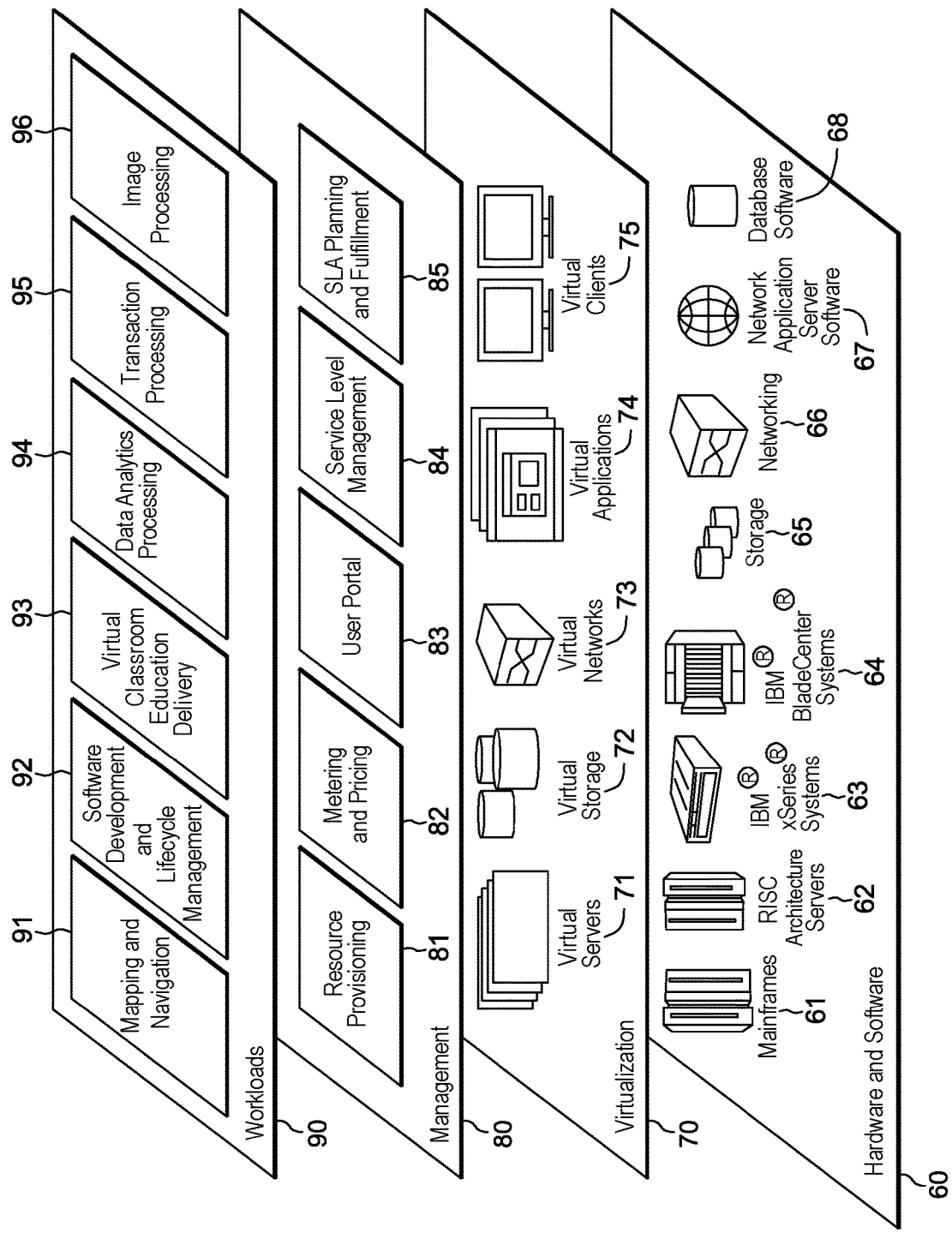
FIG. 8 depicts abstraction model layers according to one embodiment.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 7-8.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 1000 of FIG. 1B and functions described with reference to analysis system 110 as set forth in the flowchart of FIG. 3. In one embodiment, data sources 140A-140Z can include one or more computing node 10 and can include one or more program 40 for performing functions described with reference to data sources 140A-140Z as set forth in the flowchart of FIG. 3. In one embodiment, administrator client computer device 130 can include one or more computing node 10 and can include one or more program 40 for performing functions described with reference to administrator client computer device 130 as set forth in the flowchart of FIG. 3. In one embodiment, deployment system 120 can include one or more computing node 10 and can include one or more program 40 for performing functions described with reference to deployment system 120 as set forth in the flowchart of FIG. 3. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 7 computing node 10 is described as being implemented in a cloud computing environment and accordingly is referred to as a cloud computing node in the context of FIG. 7.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for processing data structures such as S expression data structures as set forth herein. The processing components 96 can be implemented with use of one or more program 40 described in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Forms of the term "defined by" herein encompass relationships where an element is partially defined by as well as relationships where an element is entirely defined by. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
 initiating evaluating of a tree data structure expression having nodes and edges between the nodes, wherein a plurality of nodes of the tree data structure expression express functions, and wherein a hierarchy of the tree data structure expression defines an order of execution of functions expressed by nodes of the plurality of nodes; and
 in response to the initiating, reading, processing and writing tile data of a dataset according to node expressed functions of the tree data structure expression, wherein the method includes receiving by a computing node the tree data structure expression from a deployment system, and wherein the reading tile data includes reading data of the tile data from a data source, wherein the computing node, the deployment system, and the data source are in network communication with one another, and external to one another, wherein the receiving by a computing node the tree data structure expression includes receiving associated software code to automatically run the tree data structure expression on the computing node so that data of the tile data is automatically read, processed and written in response to the receiving by a computing node the tree data structure expression from the deployment system.

2. The method of claim 1, wherein the dataset is a geospatial dataset of a geographic information system (GIS), wherein one or more nodes of the plurality of nodes of the tree data structure expression express Map Algebra commands, the Map Algebra commands being scripting language commands.

3. A method comprising:
    initiating evaluating of a tree data structure expression having nodes and edges between the nodes, wherein a plurality of nodes of the tree data structure expression express functions, and wherein a hierarchy of the tree data structure expression defines an order of execution of functions expressed by nodes of the plurality of nodes; and
    in response to the initiating, reading, processing and writing tile data of a dataset according to node expressed functions of the tree data structure expression, wherein the method includes deploying the tree data structure expression on a computing node external to a data source that is in network communication with the computing node, and running the tree data structure expression on the computing node external to a data source responsively to the deploying the tree data structure expression to perform the initiating so that data of the tile data is read, processed and written in response to the deploying the tree data structure expression and wherein the reading tile data includes reading data of the tile data from the data source external to the computing node.

4. The method of claim 3, wherein the dataset is a geospatial dataset of a geographic information system (GIS).

5. The method of claim 3, wherein nodes of the plurality of nodes of the tree data structure expression express Map Algebra commands, wherein the Map Algebra commands are scripting language commands mapped to Map Algebra commands of a compiled code library, the compiled code library having a plurality of compiled code Map Algebra commands.

6. The method of claim 3, wherein a node of the plurality of nodes of the tree data structure expression expresses a Map Algebra command, wherein the Map Algebra command is a scripting language command linked to a Map Algebra command of a compiled code library, wherein the tree data structure expression is encoded to processes an input tile so that an output tile output using the Map Algebra command produces an output tile than inherits an address of the input tile.

7. The method of claim 3, wherein a highest order node of the tree data structure expression specifies a write command and wherein a lowest order of the tree data structure expression specifies a read command.

8. The method of claim 3, wherein the dataset is formatted as a tile dataset, and wherein the initiating, reading, processing and writing tile data of a dataset includes sequentially reading, processing and writing a succession of tiles of the dataset ordered by tile addresses of the dataset.

9. The method of claim 3, wherein the dataset includes streamed tiles from a first database, and wherein a node of a plurality of nodes of the tree data structure expression expresses an ordering command, wherein the ordering command orders tile data from the dataset and a second dataset, and wherein the second dataset includes streamed tiles from a second database, the second database being external to the first database.

10. The method of claim 3, wherein the dataset includes streamed tiles from a first database, and wherein the reading in response to the initiating evaluating includes reading tile data from the dataset and reading tile data from a second dataset, and wherein the second dataset includes streamed tiles from a second database, the second database being external to the first database.

11. The method of claim 3, wherein the dataset includes streamed tiles from a first database, and wherein the reading in response to the initiating evaluating includes reading tile data from the dataset and reading tile data from a second dataset, and wherein the second dataset includes streamed tiles from a second database, the second database being external to the first database, and wherein a node of the tree data structure expression expresses a function which when executed results in duplicate data of a common location between the dataset and the second dataset being merged.

12. The method of claim 3, wherein writing tile data in response to the initiating evaluating includes iteratively writing a succession of processed tiles processed using the tree data structure expression to an external database without writing of the succession of processed tiles to a local persistent storage location.

13. The method of claim 3, wherein a node of the tree data structure expression specifies a read command which when executed results in input tile data from a database external to a computing node performing the processing being read.

14. The method of claim 3, wherein a node of the tree data structure expression specifies a write command which when executed results in output tile data being written to an external database external to the computing node.

15. The method of claim 3, wherein a first node of the tree data structure expression specifies a read command which when executed results in input tile data from a database external to a computing node performing the processing being read, wherein a second node of the tree data structure expression specifies a write command which when executed results in output tile data being written to an external database external to the computing node.

16. The method of claim 3, wherein a first node of the tree data structure expression specifies a read command which when executed results in input tile data from a database external to a computing node performing the processing being read, wherein a second node of the tree data structure expression specifies a write command which when executed results in output tile data being written to a local database local to the computing node performing the processing.

17. The method of claim 3, wherein one or more nodes of the plurality of nodes of the tree data structure expression express Map Algebra commands.

18. The method of claim 3, wherein one or more nodes of the plurality of nodes of the tree data structure expression express Map Algebra commands, the Map Algebra commands being scripting language commands.

19. The method of claim 3, wherein the computing node external to the data source that is in network communication with the computing node is a computing node is selected from the group consisting of a computing node external to a deployment system configured for deploying the tree data structure expression and a computing node co-located with the deployment system.

20. A method comprising:
    initiating evaluating of a tree data structure expression having nodes and edges between the nodes, wherein a plurality of nodes of the tree data structure expression express functions, and wherein a hierarchy of the tree data structure expression defines an order of execution of functions expressed by nodes of the plurality of nodes; and in response to the initiating, reading, processing and writing tile data of a dataset according to node expressed functions of the tree data structure expression, wherein the dataset includes streamed tiles from a first database, and wherein the reading in response to the initiating evaluating includes reading tile data from the dataset and reading tile data from a second dataset, and wherein the second dataset includes streamed tiles from a second database, the second database being external to the first database.

* * * * *